US008965862B2

(12) United States Patent
Allred et al.

(10) Patent No.: US 8,965,862 B2
(45) Date of Patent: Feb. 24, 2015

(54) DIRECTORY OPLOCK

(75) Inventors: Christian Gregory Allred, Snohomish, WA (US); Sarosh Cyrus Havewala, Kirkland, WA (US); Neal Robert Christiansen, Jr., Bellevue, WA (US); David Matthew Kruse, Kirkland, WA (US); Mathew George, Bellevue, WA (US); Matthew Stuart Garson, Seattle, WA (US); Daniel Edward Lovinger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1156 days.

(21) Appl. No.: 12/884,624

(22) Filed: Sep. 17, 2010

(65) Prior Publication Data

US 2012/0072400 A1 Mar. 22, 2012

(51) Int. Cl.
*G06F 17/30* (2006.01)

(52) U.S. Cl.
CPC ................................ *G06F 17/30171* (2013.01)
USPC ....................................................... 707/704

(58) Field of Classification Search
CPC .................... G06F 17/30067; G06F 17/30008; H04L 41/0645
USPC .................................................. 707/704, 781
See application file for complete search history.

(56) References Cited

U.S. PATENT DOCUMENTS

| 5,946,690 | A | 8/1999 | Pitts |
| 6,385,701 | B1 | 5/2002 | Krein et al. |
| 8,156,164 | B2 * | 4/2012 | Anderson et al. ............. 707/822 |
| 8,452,743 | B2 * | 5/2013 | Vasudevan et al. ........... 707/704 |
| 2001/0044792 | A1 * | 11/2001 | Kikuchi et al. .................. 707/3 |
| 2002/0019874 | A1 | 2/2002 | Borr |
| 2009/0234856 | A1 | 9/2009 | Miloushev et al. |
| 2009/0327360 | A1 | 12/2009 | Rajaram et al. |
| 2010/0185704 | A1 | 7/2010 | George et al. |

OTHER PUBLICATIONS

Microsoft Corporation, Filter Driver Development Guide, 2004, <<download/e/b/a/eba1050f-31d-436b-9281-92cdfeae4b45/ FilterDriverDeveloperGuide.doc>>, Version1.0a, pp. 1-28.*

(Continued)

*Primary Examiner* — Jean B Fleurantin
(74) *Attorney, Agent, or Firm* — John Jardine; Kate Drakos; Micky Minhas (57) ABSTRACT

Current file systems may implement opportunistic locks on files that allow clients to locally cache file data, while promoting data consistency when multiple clients read/write the same file. Unfortunately, when a client locally caches directory content of a directory, the file system may lack a mechanism for notifying the client of changes to the directory that would render the cached directory content "stale". Accordingly, one or more systems and/or techniques for managing a directory oplock are disclosed herein. A directory oplock may be generated based upon an oplock request comprising a first target key and a first parent key. Subsequent access requests for access to the directory or objects therein may be compared with the directory oplock to determine whether to break the directory oplock, and notify the client (e.g., directory oplock is broken if the client submitting the access request is different than the client owning the directory oplock).

20 Claims, 9 Drawing Sheets

(56) References Cited

OTHER PUBLICATIONS

"PC Ext: Explanation of Opportunistic Locking on Windows NT"—Published Date: Dec. 5, 2003, Article ID: 129202, Revision: 3.0, pp. 1-3, http://support.microsoft.com/kb/129202.

Shepler, S., "RFC 2624—NFS Version 4 Design Considerations"—Published Date: Jun. 1999, Sun Microsystems, Inc., pp. 1-23, http://tools.iet.org/html/rfc2624.

"Chapter 17. File and Record Locking"—Retrieved Date: Aug. 16, 2010; pp. 1-13, http://www.samba.org/samba/docs/man/Samba-HOWTO-Collection/locking.html#id2615926.

"Chapter 8. Advanced Disk Shares"—Retrieved Date: Aug. 16, 2010, pp. 1-34, http://www.samba.org/samba/docs/using_samba/ch08.html.

* cited by examiner

DIRECTORY OPLOCK

BACKGROUND

Opportunistic locks ("oplocks") are used by file systems to provide clients, such as local and/or remote applications, with the ability to cache file data, while providing a mechanism for promoting data consistency when multiple clients read/write the same file. Additionally, an oplock provides an application with the ability to "back off" from accessing a file so that the application does not interfere with another application's access to the file. In one example, a first application may negotiate an oplock on a text file stored on a file system. The first application may locally cache data corresponding to the text file to reduce network traffic and/or access requests in accessing such data (e.g., multiple writes may be performed locally to the cached data). If a second application attempts to access the text file on the file system, then the file system may break the oplock by sending notification to the first application to update changes on the text file back to the file system. In this way, the text file may remain consistent between the first application, the second application, and the file system. Unfortunately, oplocks are currently available for files, but not directories. Thus, if a first application locally caches directory contents from a file system, and a second application changes the directory on the file system, then the first application's locally cached directory contents may be stale because the first application is not notified of the second application's changes to the directory.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for managing a directory oplock are disclosed herein. A directory oplock may be interpreted as an opportunistic lock on a directory (e.g., a file folder, a mapped disk drive, a directory located on a remote server, etc.). An oplock request for a directory oplock on a directory may be received from a client (e.g., a file management application, a "Save as" dialogue box, a search indexer service, a virus scanner, and/or other clients). It may be appreciated that in one example a client may be interpreted as comprising one or more applications executing either locally (e.g., on the same device, such as a laptop, desktop, etc.) or remotely (e.g., on a different/separate device, such as a server, etc.) in relation to the directory (e.g., the device(s) upon which the directory resides). The oplock request may comprise a first target key and a first parent key. The first target key may specify a unique identifier corresponding to the directory and the client requesting the directory oplock. The first parent key may specify a unique identifier corresponding to a parent directory comprising the directory and the client requesting the directory oplock. The directory oplock key may be generated based upon the oplock request.

The client that requested and was granted the directory oplock may locally cache directory content of the directory (e.g., directory metadata, a listing of files and sub-directories of the directory, etc.). It will be appreciated that network traffic may be reduced because the client can perform I/O operations on the locally cached directory content without directly accessing the directory across a network, for example. Similarly, a number of access requests may be reduced by allowing a client, such as a local application, to cache its own copy of the directory. In this way, the client may assume that the locally cached directory content is up-to-date. Additionally, the client may be notified of attempts to access the directory and/or objects within the directory, which may render the locally cached directory content "stale" (e.g., the cached directory content may comprise a listing of 5 files within the directory, however, another client may add 3 more files to the directory that would not be reflected in the cached directory content).

In particular, an access request for access to an object within the directory may be received (e.g., a second client may be attempting to modify a file object within the directory; the client corresponding to the directory oplock may be attempting to delete a file object within the directory; etc.). It may be appreciated that the access request may comprise a request to perform operations upon the directory (e.g., rename or delete the directory). The access request may comprise a second target key and a second parent key. The second target key may specify a unique identifier corresponding to the object within the directory and a client requesting the access request. The second parent key may specify a unique identifier corresponding to the directory (e.g., the directory is the parent of the target object) and the client requesting the access request.

The second parent key corresponding to the directory may be compared with the first target key corresponding to the directory to determine whether the second parent key and the first target key match. That is, the second parent key and the first target key may match if the client owning the directory oplock is the same client attempting to access objects within the directory because the respective keys are based upon the same client. Otherwise, the second parent key and the first target key may not match if the client attempting the access objects within the directory is different than the client owning the directory oplock because the respective keys are based upon different clients.

If the second parent key matches the first target key, then the directory oplock is not broken because the client owning the directory oplock is the same client attempting to access objects within the directory. Such a client may know to update its locally cached directory content with its own changes. In contrast, if the second parent key does not match the first target key, then the directory oplock is broken because the client owning the directory oplock is different than the client attempting to access objects within the directory. The client owning the directory oplock may have locally cached directory content that may become "stale" when the other client accessing objects within the directory make changes affecting the directory data. Thus, the client owning the directory oplock is notified of the break, such that the client may take appropriate action to promote data consistency between itself, the other client, and the original directory data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Since the advent of network computing and multitasking, directories and files are often shared amongst multiple clients, such as applications within a computing environment or computers within a network environment. In one example, a file server system may provide network devices with access to shared directories and files. In another example, a local client application may attempt to access a local directory in order to cache contents of the local directory. However, network bandwidth, resource utilization (e.g., CPU usage, system bus, storage, etc.), and/or data consistency issues arise when multiple clients, whether across a network or within a single computing environment, access the same data. Accordingly, opportunistic locks ("oplocks") may be implemented to allow clients to locally cache file data. That is, a client may request an oplock on file data, such that the client may assume the file data has not been changed so long as the oplock has not been broken by another client's attempt to access and/or alter the actual file data. The client may read/write to the locally cached file data without generating network traffic to access the actual file data that may be stored across a network, for example. When finished, the client may update the actual file data with the locally cached file data with a single update. If a second client attempts to access the file data, then the oplock may be broken, and the second client waits while the client owning the oplock may be notified of the break. In this way, the client may update the actual file data with the locally cached file data, and provide acknowledgement of the break so that the second client may access the updated file data unaware of the interaction with the first client.

Unfortunately, oplocks are currently available for file data, but not for directory data. The lack of oplocks for directory data may lead to unnecessary access requests, "stale" cached directory data, and/or the inability to delete a directory because a client (e.g., a search indexer, virus scanner, etc.) may be unaware that another client is attempting to delete the directory and/or its contents. In one example, a client that locally caches directory content of a directory may have to implement a refresh mechanism in an attempt to keep the locally cached directory content up-to-date with potential changes to the actual directory from other clients. The refresh mechanism may perform unnecessary refreshes because the actual directory has not changed. Additionally, there may be a period of time when the locally cached directory content is "stale" because another client changed the actual directory and the locally cached directory content has not been refreshed.

Accordingly, one or more systems and/or techniques for managing a directory oplock are provided herein. In particular, a directory oplock for a directory may be created for a first client based upon an oplock request comprising a first target key and a first parent key. The first client may locally cache directory content of the directory to reduce network traffic. To promote data consistency and mitigate "stale" cached directory content, notifications (e.g., immediate notification without reliance upon a timer) may be provided to the first client when a second client attempts to access the directory. In this way, the first client may flush back changes to the directory so that the second client may access an up-to-date version of the directory. Additionally, the first client may be notified to refresh the locally cached directory content from the actual directory because the cached content may be "stale" if the second client makes changes to the actual directory and/or objects within the actual directory. The directory oplock may be broken if the second client is not the same client as the first client. However, if the second and first clients are the same client, then the directory oplock may not be broken because the client may be aware of its own changes to the directory.

Figure 1:
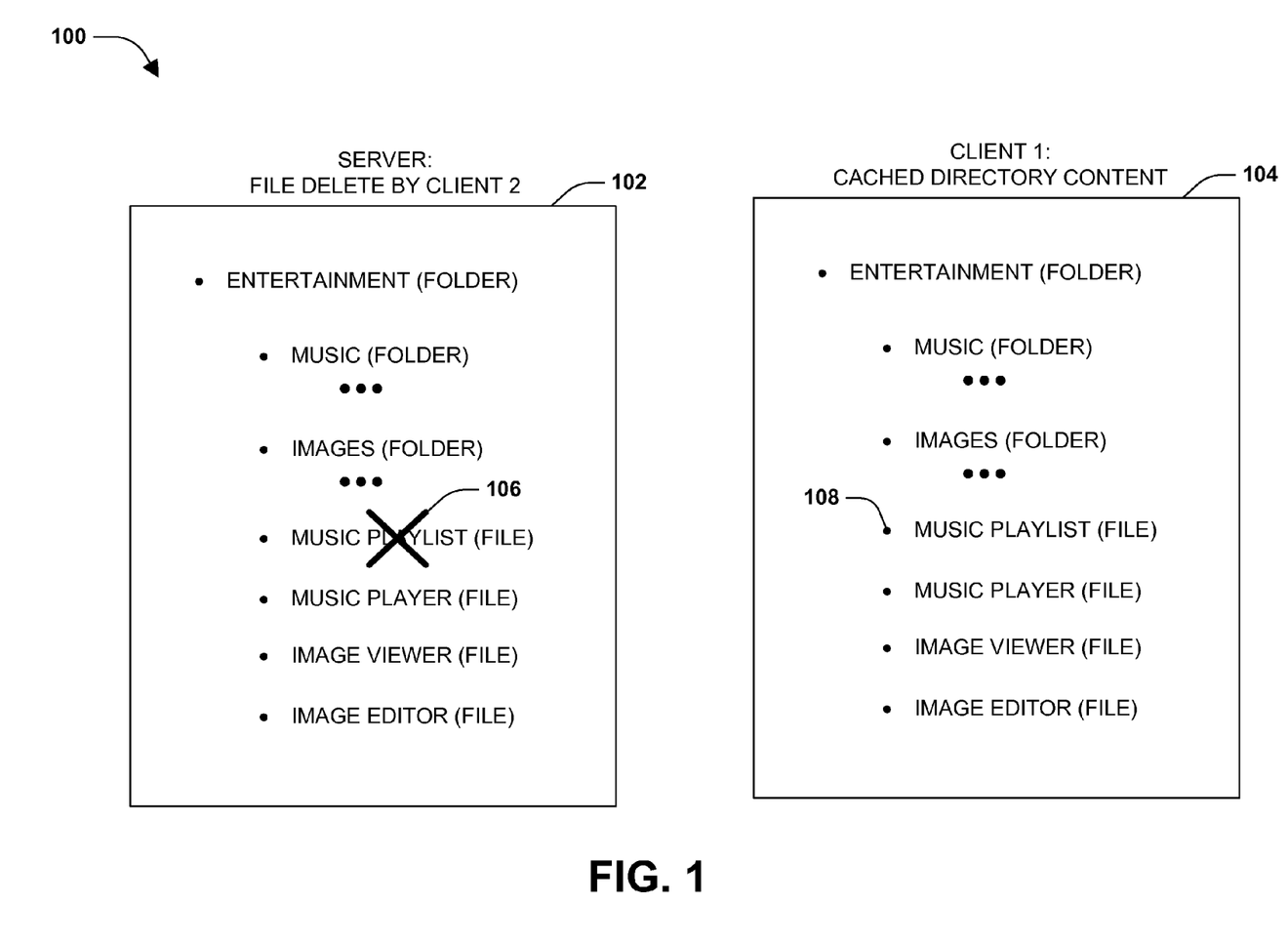
FIG. 1 is an illustration of an example of locally cached directory content of a first client that becomes stale when a second client deletes a file within the actual directory.

FIG. 1 illustrates an example 100 of locally cached directory content of a first client that becomes "stale" when a second client deletes a file within the actual directory. A server 102 may comprise a file system configured to provide clients with access to directories and/or files. For example, the server 102 may comprise an Entertainment (folder) directory. The Entertainment (folder) directory may comprise a Music (folder) directory, an Images (folder) directory, a Music Playlist (file), a Music Player (file), an Image Editor (file), and an Image Viewer (file). Client (1) 104 (e.g., a file management application) may access the Entertainment (folder) directory on the server 102 to provide a user with a view of the Entertainment (folder) directory. To mitigate network traffic, the client (1) 104 may locally store cached directory content corresponding to the Entertainment (folder) directory. The client (1) 104 may periodically or on-demand poll the server 102 to refresh the cached directory content to provide the user with a current view of the file structure. Refreshing the cached directory content may create unnecessary network traffic because the content of the directory at the server 102 may not have changed.

The cached directory content locally stored on client (1) 104 may become "stale" between the time a change occurs to the Entertainment (folder) directory by another client and a refresh of the cached directory content (e.g., an out-of-date view of the Entertainment (folder) directory). For example, a client (2) may delete 106 the Music Playlist (file) on the server 102. However, notification may not be provided to the client (1) 104 of the delete 106 that may affect the "correctness" of the cached directory content locally stored on client (1) 104 until a refresh is performed because there is no directory oplock on the Entertainment (folder) directory. That is, if a directory oplock had been provided to client (1) 104 on the Entertainment (folder) directory, then notification (e.g., immediate notification) may have been provided to client (1) 104 of client (2)'s requested access corresponding to the delete 106.

Figure 2:
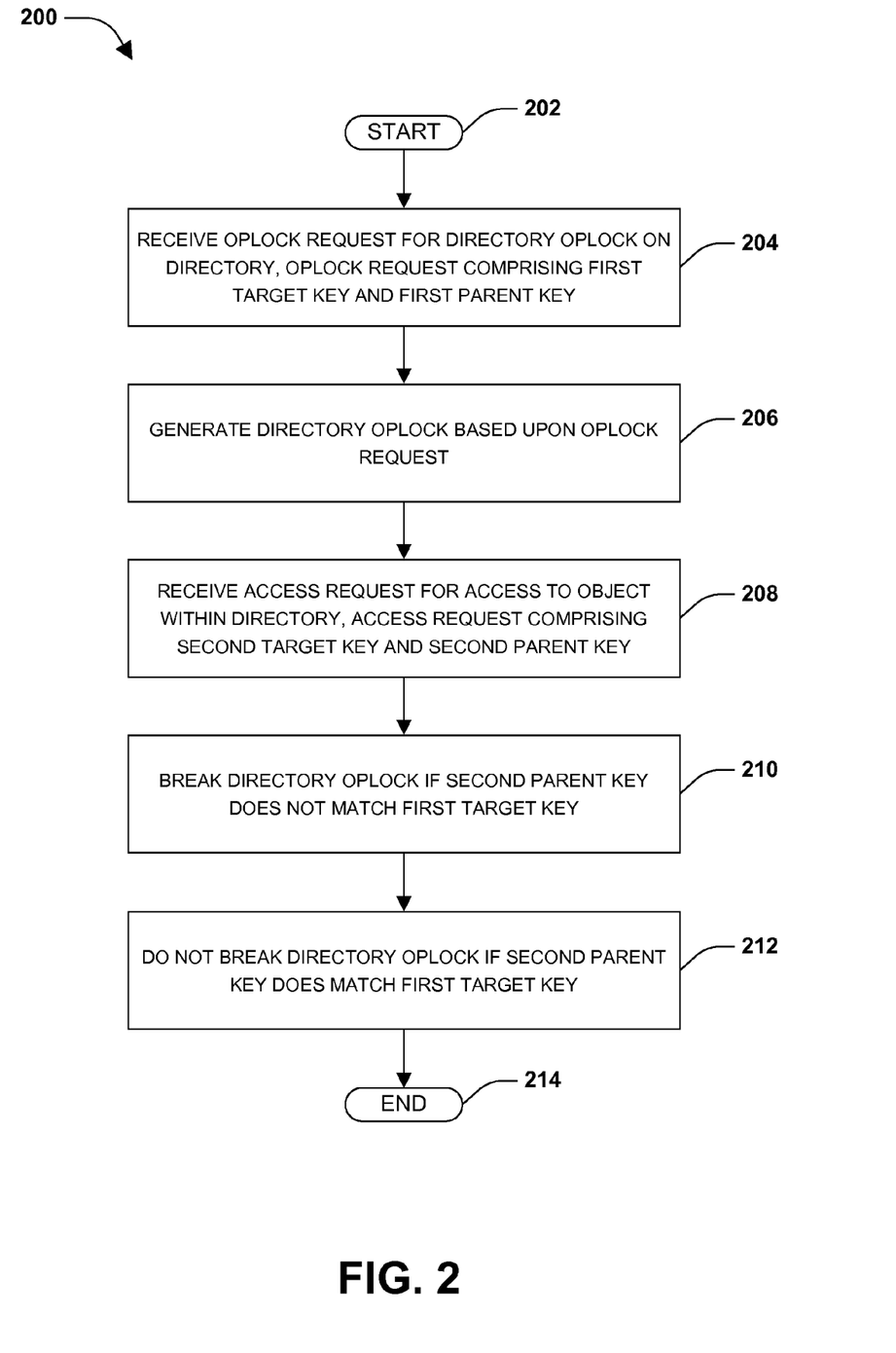
FIG. 2 is a flow chart illustrating an exemplary method of managing a directory oplock.

One embodiment of managing a directory oplock is illustrated by an exemplary method 200 in FIG. 2. At 202, the method starts. At 204, an oplock request for a directory oplock on a directory is received, for example, from a first client. The oplock request may comprise a first target key and/or a first parent key. The first target key may specify a unique identifier corresponding to the first client and the directory. The first parent key may specify a unique identifier corresponding to the first client and a parent directory comprising the directory.

At 206, a directory oplock may be generated based upon the oplock request. In one example, a read caching directory oplock may be generated so that the first client may locally cache directory content that is read from the directory. In another example, a read-handle caching directory oplock may be generated so that the first client may locally cache directory content that is read from the directory and open handles on the directory. In another example, a read-write-handle caching directory oplock may be generated so that the first client may locally cache the creation, deletion and/or modification of files in the directory (e.g., modification of an attribute, such as read-only, file size, etc.). In this way, the directory oplock may be managed for the first client. In particular, the first client may be notified of a break of the directory oplock because a second client, different from the first client, is attempting to access/modify the directory and/or objects within the directory that may change the current state of the directory (e.g., a second client may add a file object to the directory, such that the current state of the directory may comprise a larger overall size and the added file object), or the first client has made changes to the directory that have to be flushed back before the second client can be aware of them. The notification of the break may put the first client on notice that the locally cached directory content may be stale or that changes made by the first client are to be flushed from its local cache back to the file system.

At 208, an access request for access to an object within the directory may be received. For example, a second client, who may be the same or different client as the first client, may request access to perform I/O operations (e.g., modify, add, delete, etc.) on files and/or sub-directories within the directory. It may be appreciated that the access request may comprise a request to perform operations upon the directory (e.g., rename or delete the directory). The access request may comprise a second target key and/or a second parent key. The second target key may specify a unique identifier corresponding to the second client and the object within the directory. The second parent key may specify a unique identifier corresponding to the second client and the directory (e.g., the directory is the parent of the object because the directory comprises the object). It may be appreciated that the second parent key may have the same identifier as the first target key if the first client and the second client are the same client (e.g., the second parent key specifies the client+the directory & the first target key specifies the client+the directory).

At 210, the directory oplock is broken if the second parent key does not match the first target key. For example, the second parent key may not match the first target key where the first client owning the directory oplock is different than the second client attempting to access objects within the directory. The first client may be notified of the directory oplock break so that the first client may be on notice that the locally cached directory content may have become "stale". If the access request corresponds to a request by the second client to perform an operation upon the directory (e.g., delete the directory, a set disposition operation, rename the directory, etc.), then notification may be sent to the second client originating the access request to wait until acknowledgement of the break by the first client.

At 212, the directory oplock is not broken if the second parent key does match the first target key. That is, the second parent key matches the first target key because the first client owning the directory oplock is the second client originating the access request. In this way, the directory oplock is not broken when the client owning the directory oplock is the client accessing objects within the directory. The client should know of the changes that it makes to the directory, and thus should be able to update the locally cached directory content without a notification of a directory oplock break.

In one example, a search indexer may originate the oplock request. The directory oplock for the directory may be generated and assigned to the search indexer. A second client, such as a file management application, may originate the access request to delete the directory. Without a notification of the attempted delete, the search indexer may continue to access the directory, which may cause the deletion of the directory to fail. For example, a user may attempt to delete a directory that the search indexer is currently indexing. However, the delete may fail if the delete is issued while the search indexer has the directory open. Thus, the user may continue to see the directory and/or may be unable to reuse the directory name (e.g., because the directory has not yet been deleted). Accordingly, the directory oplock created by the search indexer may be broken if the second parent key does not match the first target key. In this way, the search indexer may be notified to back out of the directory so that the user may delete the directory. At 214, the method ends.

Figure 3:
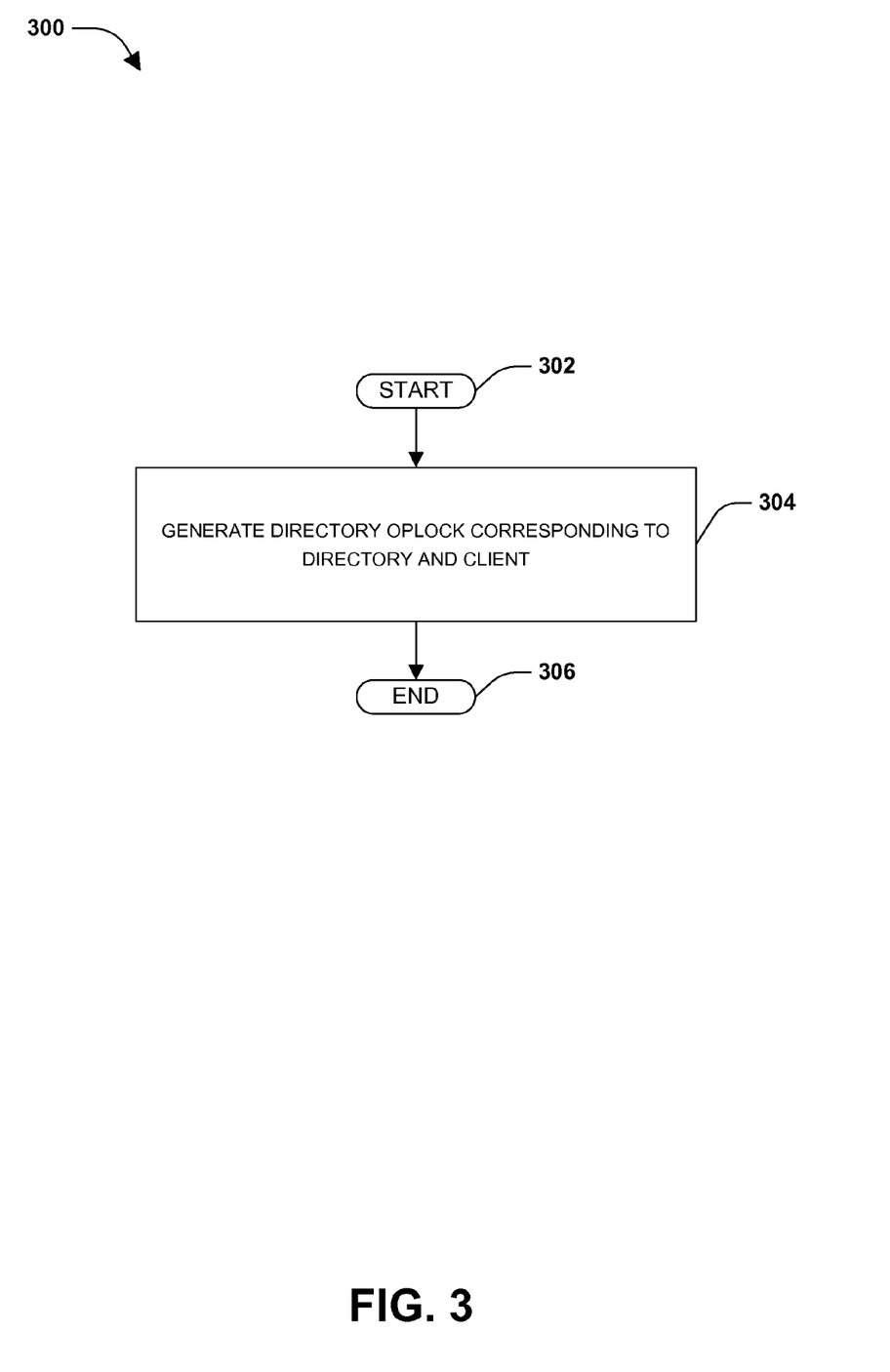
FIG. 3 is a flow chart illustrating an exemplary method of generating a directory oplock.

One embodiment of generating a directory oplock is illustrated by an exemplary method 300 in FIG. 3. At 302, the method starts. At 304, a directory oplock corresponding to a directory and a client is generated. That is, the directory oplock is an opportunistic lock on a directory (e.g., a file folder) as opposed to a file. At 306, the method ends.

Figure 4:
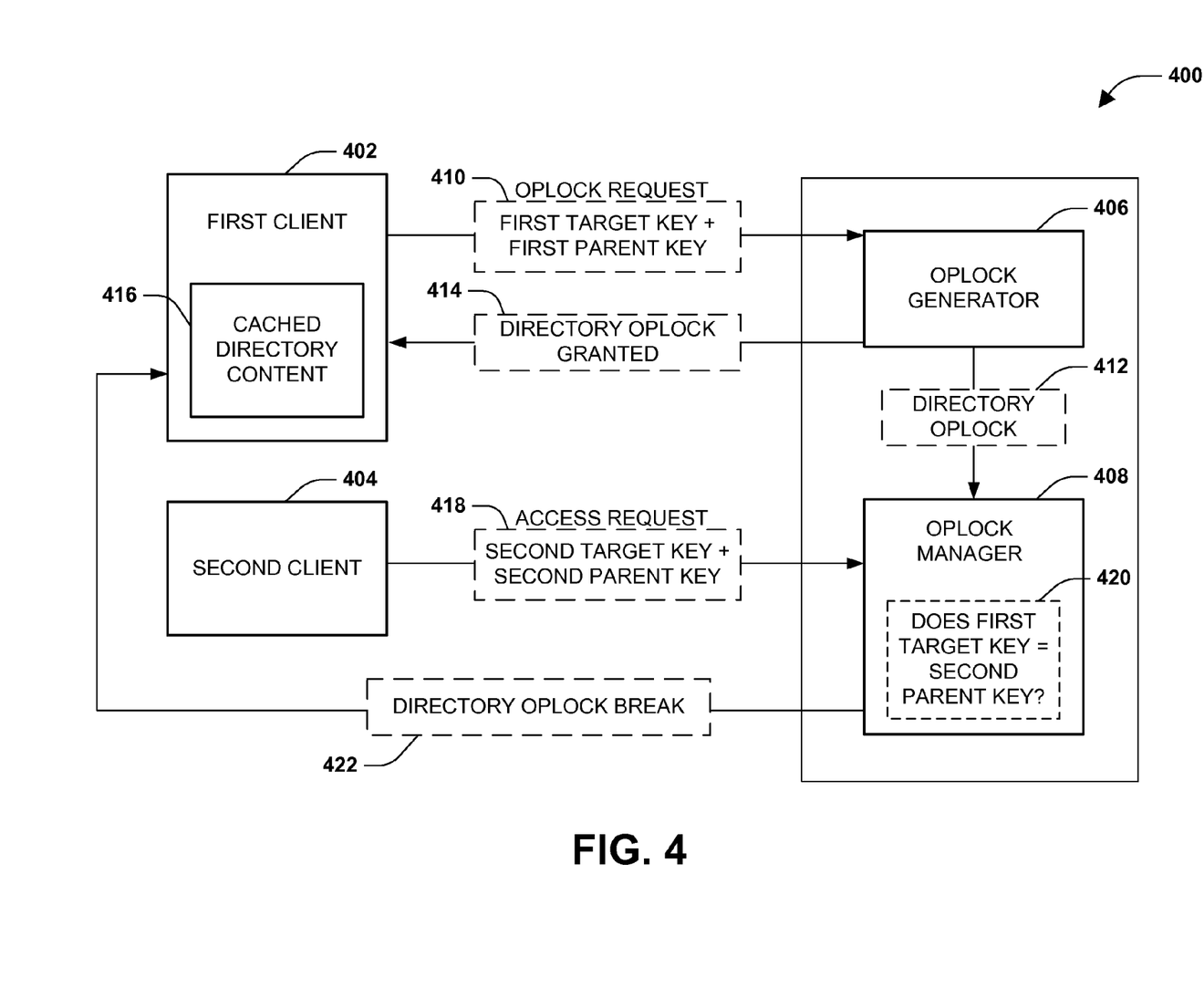
FIG. 4 is a component block diagram illustrating an exemplary system for managing a directory oplock.

FIG. 4 illustrates an example of a system 400 configured for managing a directory oplock. The system 400 may comprise an oplock generator 406 and/or an oplock manager 408. The oplock generator 406 may be configured to receive an oplock request 410 for a directory oplock 412 on a directory. For example, the oplock request 410 may be received from a first client 402. The oplock request 410 may comprise a first target key and/or a first parent key. The first target key may specify a unique identifier corresponding to the first client 402 and the directory. The first parent key may specify a unique identifier corresponding to the first client 402 and a parent directory comprising the directory.

The oplock generator 406 may generate the directory oplock 412 based upon the oplock request 410. In one example, the directory oplock 412 may comprise a read-caching oplock. In another example, the directory oplock 412 may comprise a read-handle-caching oplock. The oplock generator 406 may send a directory oplock granted notification 414 to the first client 402. In this way, the first client 402 may locally store directory content within cached directory content 416. The first client 402 may efficiently perform I/O operations on the cached directory content 416 without generating unnecessary network traffic to access the actual directory.

The oplock manager 408 may be configured to receive an access request 418 for access to an object within the directory. For example, the access request 418 may be received from a second client 404 requesting access to the directory, a file with the directory, and/or a sub-directory within the directory. The access request 418 may comprise a second target key and/or a second parent key. The second target key may specify a unique identifier corresponding to the second client 404 and the object within the directory. The second parent key may specify a unique identifier corresponding to the second client 404 and the directory. It may be appreciated that the first client 402 and the second client 404 may be the same or different clients, which may affect whether the directory oplock 412 is broken by the access request 418.

The oplock manager 408 may be configured to perform a matching operation 420 to determine whether the first target key matches the second parent key. The oplock manager 408 may be configured to not break the directory oplock 412 if the second parent key matches the first target key because the match indicates that the first client 402 and the second client 404 are the same client, and thus it may be unnecessary to notify the client of its own access to the directory.

The oplock manager 408 may be configured to break the directory oplock 412 if the second parent key does not match the first target key. The oplock manager 408 may send a directory oplock break notification 422 to the first client 402. The directory oplock break notification 422 may notify the first client 402 that the cached directory content 416 may be "stale". If the access request corresponds to an operation upon the directory, then the oplock manager 408 may send notification to the second client 404 to wait until acknowledgement of the break by the first client 402 before accessing the directory.

In one example, the oplock manager 408 may be configured to receive a directory delete access request (e.g., access request 418) comprising an I/O request to perform a directory delete on the directory. The oplock manager 408 may notify the first client 402 associated with the directory oplock 412 to back out of the directory so that the second client 404 originating the directory delete access request may delete the directory.

In one example, the oplock generator 406 may be configured to generate an atomic oplock in response to a directory access request to access the directory. The oplock generator 406 may generate the atomic oplock spanning a timeframe between the directory access request and the oplock request for the directory oplock on the directory. For example, the first client 402 may perform an initial directory access request before performing an oplock request. There may be a time period between the initial directory access request and the generating of the directory oplock where the first client is "unprotected" because the directory oplock has not been generated, but the directory may already be open. The atomic oplock may mitigate sharing violations during this time period.

Figure 5:
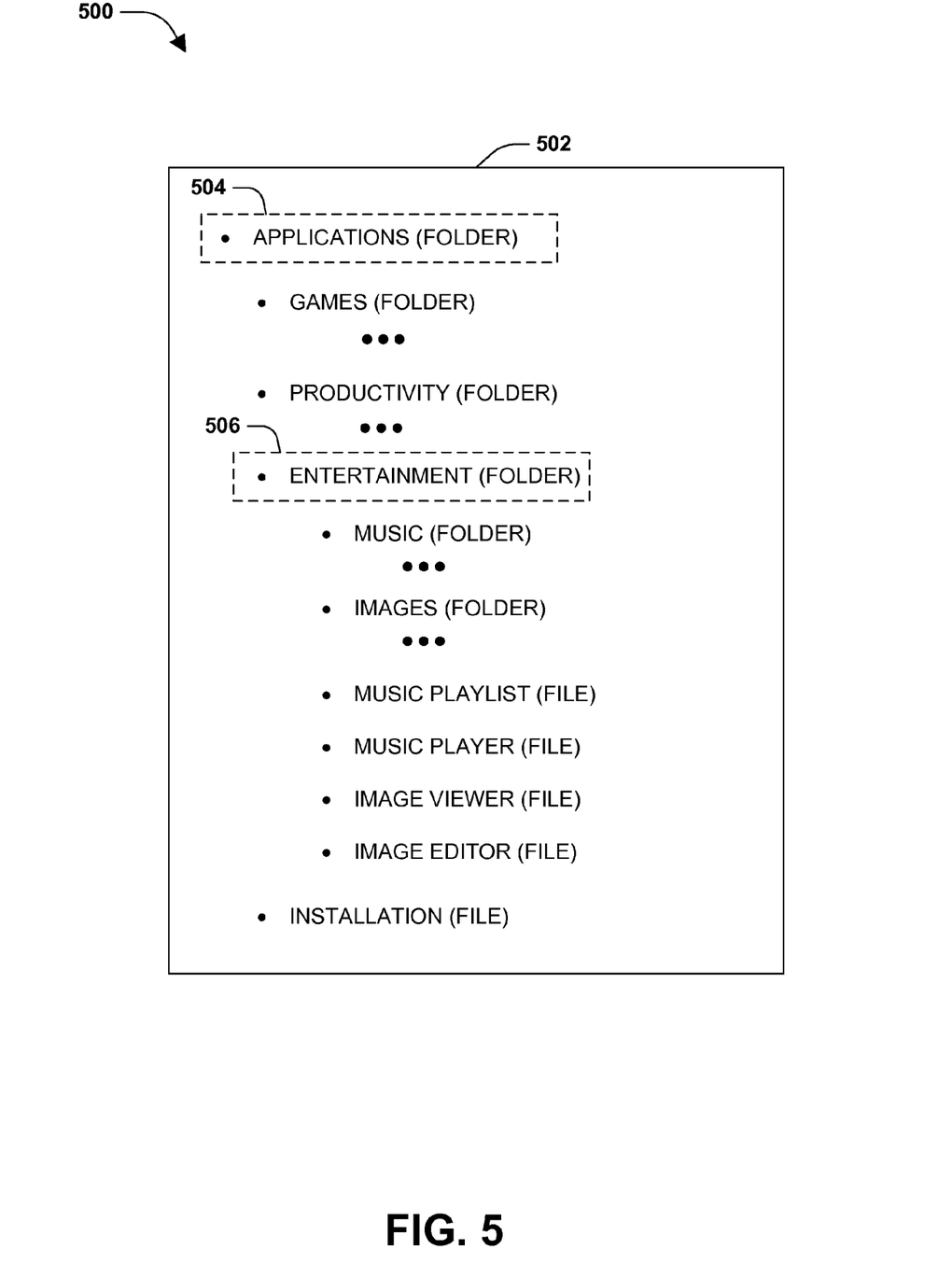
FIG. 5 is an illustration of an example of a directory upon which a directory oplock is requested.

FIG. 5 illustrates an example 500 of a directory upon which a directory oplock is requested. A file structure 502 may comprise directories (e.g., folders) and/or files. For example, the file structure 502 may be maintained by a remote file server. In one example, the file structure 502 or a portion thereof may comprise an Applications (folder) 504 directory. The Applications (folder) 504 directory may be the parent directory of a Games (folder) directory, a Productivity (folder) directory, an Entertainment (folder) 506 directory, an Installation (file), and/or other objects comprised within the Applications (folder) 504 directory. The Entertainment (folder) 506 directory may be the parent directory of a Music (folder) directory, an Images (folder) directory, a Music Playlist (file), a Music Player (file), an Image Viewer (file), an Image Editor (file), and/or other objects comprised within the Entertainment (folder) 506 directory.

The remote file server may be configured to allow local and/or remote clients to access directories and files within the file structure 502. Opportunistic locks may be available for directories and/or files. In one example, an oplock request for a directory oplock on the Entertainment (folder) 506 directory may be received from a first client. In particular, the first client may be requesting a directory oplock for the Entertainment (folder) 506 directory so that the first client may locally cache directory content corresponding to the Entertainment (folder) 506 directory. The oplock request may comprise a first target key and a first parent key. The first target key may specify a unique identifier corresponding to the first client and the Entertainment (folder) 506 directory. The first parent key may specify a unique identifier corresponding to the first client and the Applications (folder) 504 (e.g., the parent directory of the target Entertainment (folder) 506 directory). In this way, the directory oplock may be generated for the first client. The first client may locally cache the directory content. For example, the first client may cache metadata associated with the Entertainment (folder) 506 directory and/or a listing of the files/sub-folders within the Entertainment (folder) 506 directory, such as the Music (folder), the Images (folder), the Music Playlist (file), the Music Player (file), the Image Viewer (file), the Image Editor (file), and/or other objects.

Figure 6:
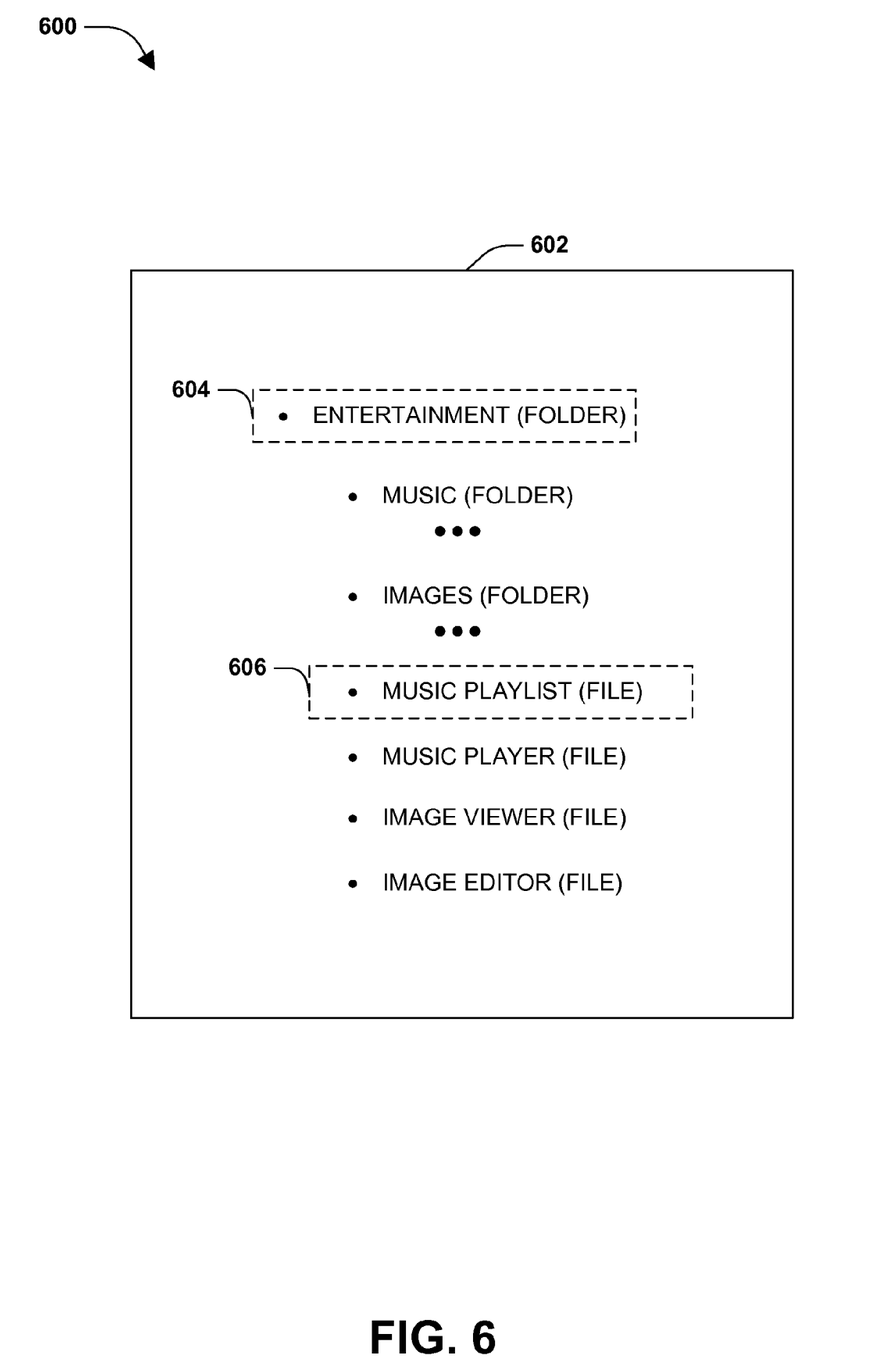
FIG. 6 is an illustration of an example of a directory upon which access is requested by a second client different than a first client owning a directory oplock on the directory.

FIG. 6 illustrates an example 600 of a directory upon which access is requested by a second client different than a first client owning a directory oplock on the directory. A file structure 602 may comprise directories (e.g., folders) and/or files. For example, the file structure 602 or a portion thereof may comprise an Entertainment (folder) 604 directory. The Entertainment (folder) 604 directory may be the parent directory of a Music (folder) directory, an Images (folder) directory, a Music Playlist (file) 606, a Music Player (file), an Image Viewer (file), an Image Editor (file), and/or other objects comprised within the Entertainment (folder) 604 directory.

It may be appreciated that a first client may own a directory oplock on the Entertainment (folder) 604 directory (e.g., FIG. 5). In one example, a second client, different than the first client owning the directory oplock, may request access to the Music Playlist (file) 606. The second client may send an access request comprising a second target key and a second parent key. The second target key may specify a unique identifier corresponding to the second client and the Music Playlist (file) 606. The second parent key may specify a unique identifier corresponding to the second client and the Entertainment (folder) 604 directory (e.g., the parent directory of the target Music Playlist (file) 606). The directory oplock may be broken because the second parent key may not match the first target key because the respective keys are based upon different clients (e.g., the first target key is based upon the first client, while the second parent key is based upon the second client different than the first client). The first client may be sent notification of the directory oplock break in order to prevent the first client from maintaining a "stale" cache of the Entertainment (folder) 604 directory. For example, the second client may modify or delete the Music Playlist (file) 606, which would not be reflected in the first client's "stale" cache.

Figure 7:
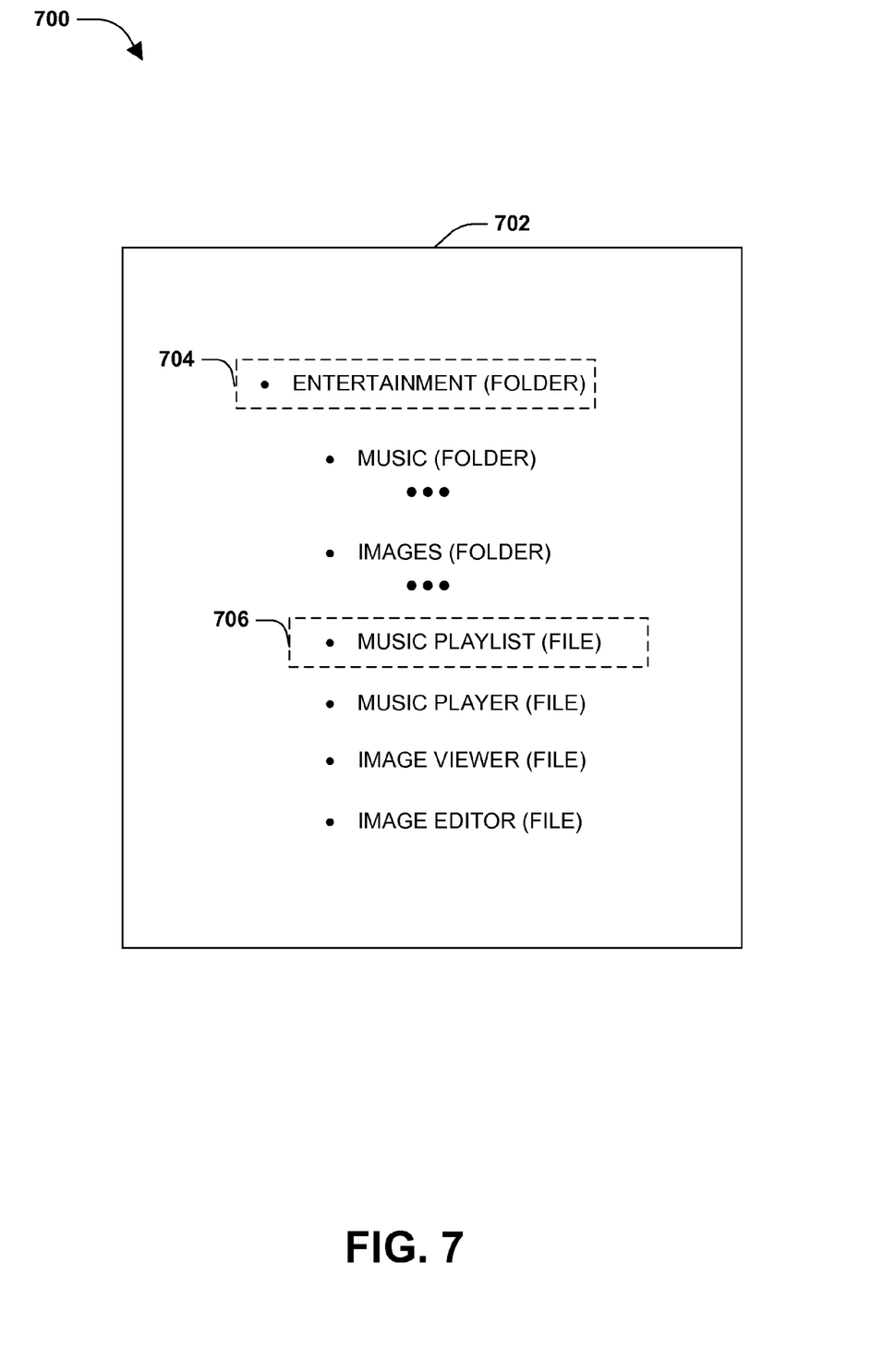
FIG. 7 is an illustration of an example of a directory upon which access is requested by a first client owning a directory oplock on the directory.

FIG. 7 illustrates an example 700 of a directory upon which access is requested by a first client owning a directory oplock on the directory. A file structure 702 may comprise directories (e.g., folders) and/or files. For example, the file structure 702 or a portion thereof may comprise an Entertainment (folder) 704 directory. The Entertainment (folder) 704 directory may be the parent directory of a Music (folder) directory, an Images (folder) directory, a Music Playlist (file) 706, a Music Player (file), an Image Viewer (file), an Image Editor (file), and/or other objects comprised within the Entertainment (folder) 704 directory.

It may be appreciated that a first client may own a directory oplock on the Entertainment (folder) 704 directory (e.g., FIG. 5). In one example, a second client may request access to the Music Playlist (file) 706. It may be appreciated that the first client and the second client are the same client in example 700, and are referred to as the client for purposes of simplicity. That is, the first client owning the directory oplock is the same client as the second client requesting access to the Music Playlist (file) 706.

It may be advantageous to detect that the same client owning the directory oplock is the same client requesting access, so that the directory oplock is not broken by such access. The client may send an access request comprising a second target key and a second parent key. The second target key may specify a unique identifier corresponding to the client and the Music Playlist (file) 706. The second parent key may specify a unique identifier corresponding to the client and the Entertainment (folder) 704 directory (e.g., the parent directory of the target Music Playlist (file) 706). The directory oplock may not be broken because the second parent key may match the first target key because both keys are based upon the same client and the same Entertainment (folder) 704 directory. In this way, the directory oplock is not broken because it may be unnecessary to provide notification to the client that the client itself is access the Entertainment (folder) 704 directory. Such notification may be unnecessary because the client should know of its access to the directory and should be able to take proper action with regard to any corresponding cached directory content.

Figure 8:
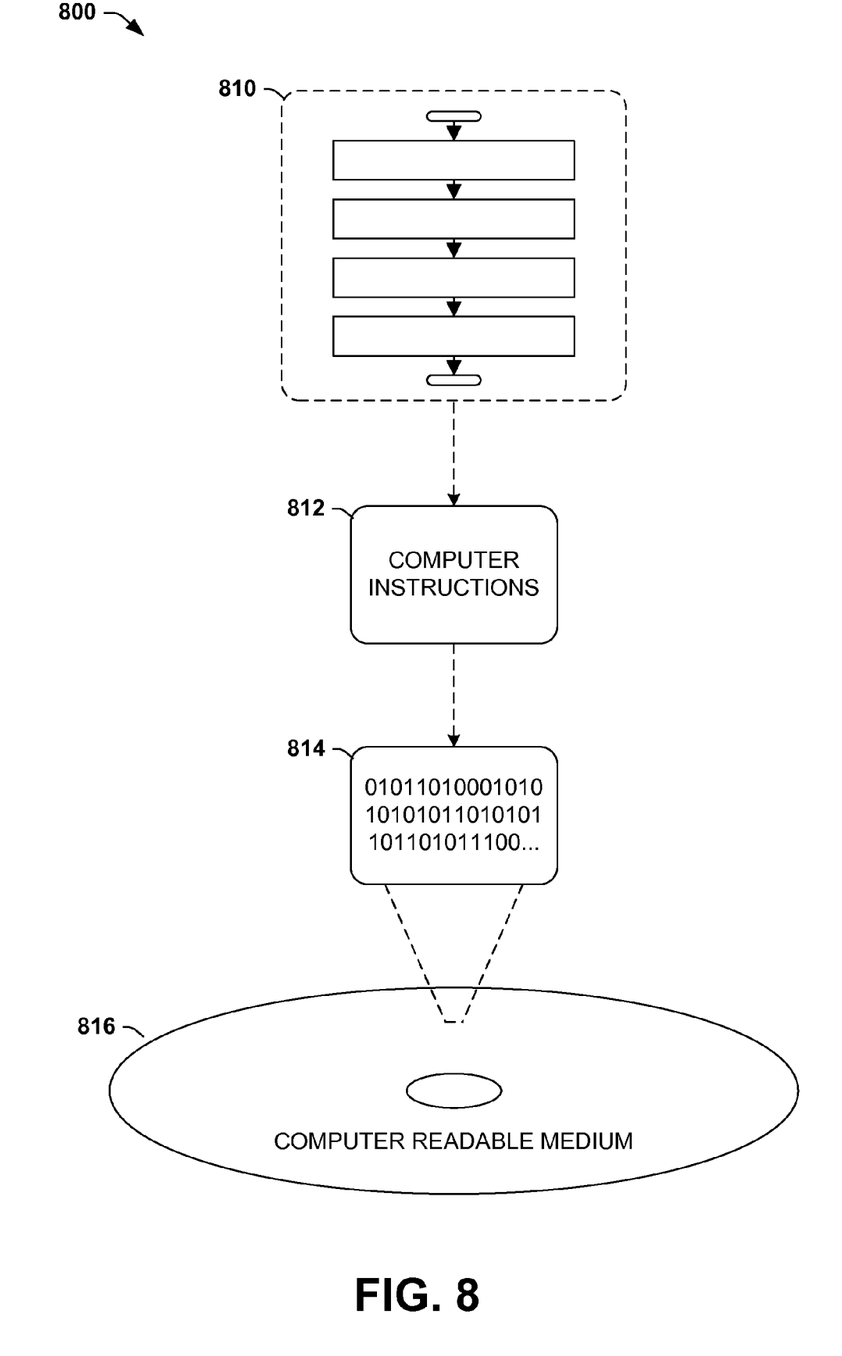
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as the exemplary method 200 of FIG. 2 and exemplary method 300 of FIG. 3, for example. In another such embodiment, the processor-executable instructions 812 may be configured to implement a system, such as the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
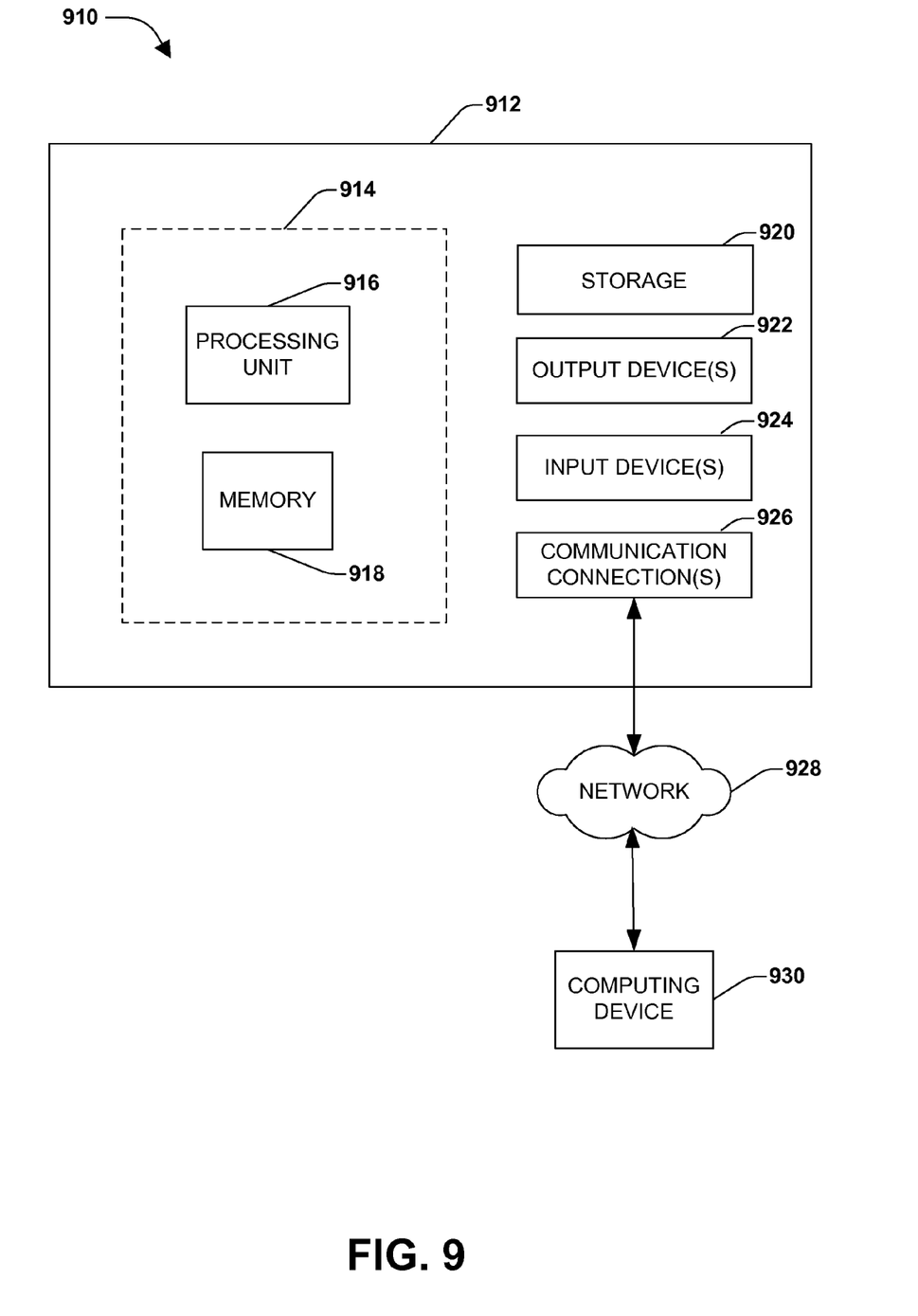
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for managing a directory oplock, the method comprising:
    receiving an oplock request for a directory oplock on a directory, the oplock request comprising a first target key and a first parent key, wherein the first target key comprises a first unique identifier for a client related to the oplock request;
    generating the directory oplock based upon the oplock request;
    receiving an access request for access to an object within the directory, the access request comprising a second target key and a second parent key, wherein the second parent key comprises a second unique identifier for a client related to the access request;
    comparing the first target key to the second parent key;
    breaking, executed by a processor, the directory oplock if the second parent key does not match the first target key; and
    not breaking the directory oplock if the second parent key does match the first target key.

2. The method of claim 1, comprising:
upon breaking the directory oplock, sending notification of the break to a first client originating the oplock request.

3. The method of claim 2, comprising:
sending notification to a second client originating the access request to wait until acknowledgement of the break by the first client, the access request corresponding to a request by the second client to perform an operation upon the directory.

4. The method of claim 3, the first target key specifying a unique identifier corresponding to the first client and the directory, and the first parent key specifying a unique identifier corresponding to the first client and a parent directory comprising the directory.

5. The method of claim 4, the second target key specifying a unique identifier corresponding to the second client and the object within the directory, and the second parent key corresponding to the second client and the directory.

6. The method of claim 1, comprising:
upon determining the second parent key does match the first target key, determining a first client originated the oplock request, the first client owns the directory oplock, and the first client originated the access request.

7. The method of claim 1, the generating the directory oplock comprising at least one of:
generating a read-write-handle-caching oplock;
generating a read-caching oplock; and
generating a read-handle-caching oplock.

8. The method of claim 1, the access request for access comprising an I/O request to perform at least one of:
modify a file object within the directory;
modify a sub-directory object within the directory;
add a file object to the directory;
add a sub-directory object within the directory;
delete a file object within the directory; and
delete a sub-directory object within the directory.

9. The method of claim 1, comprising:
assigning the directory oplock to a first client originating the oplock request; and
if the second parent key does not match the first target key, then notifying the first client to back out of the directory in order for a second client originating the access request to perform an operation related to the directory.

10. A system for maintaining a directory oplock, comprising:
at least one processor; and
memory encoding computer executable instructions, that, when executed by the at least one processor, perform a method for managing a directory oplock, the method comprising:
receiving an oplock request for a directory oplock on a directory, the oplock request comprising a first target key and a first parent key, wherein the first target key comprises a first unique identifier for a client related to the oplock request;
generating the directory oplock based upon the oplock request;
receiving an access request for access to an object within the directory, the access request comprising a second target key and a second parent key, wherein the second parent key comprises a second unique identifier for a client related to the access request;
comparing the first target key to the second parent key;
breaking the directory oplock if the second parent key does not match the first target key; and
not breaking the directory oplock if the second parent key does match the first target key.

11. The system of claim 10, wherein the memory further comprises instructions for:
generating an atomic oplock in response to a directory access request to access the directory.

12. The system of claim 11, the atomic oplock spanning a timeframe between the directory access request and the oplock request for the directory oplock on the directory.

13. The system of claim 10, the object comprising at least one of:
a file within the directory; and
a sub-directory within the directory.

14. The system of claim 10, wherein the memory further comprises instructions for:
sending notification of a directory oplock break to a first client originating the oplock request.

15. The system of claim 14, wherein the memory further comprises instructions for:
sending notification to a second client originating the access request to wait until acknowledgement of the break by the first client, the access request corresponding to a request by the second client to perform an operation upon the directory.

16. The system of claim 10, wherein the memory further comprises instructions for:
receiving a directory access request comprising an I/O request to perform an operation on the directory; and
notifying a client associated with the directory oplock to back out of the directory in order for a client originating the directory access request to perform the operation on the directory.

17. The system of claim 10, the first target key specifying a unique identifier corresponding to a first client and the directory, and the first parent key specifying a unique identifier corresponding to the first client and a parent directory comprising the directory.

18. The system of claim 10, the second target key specifying a unique identifier corresponding to a second client and the object within the directory, and the second parent key specifying a unique identifier corresponding to the second client and the directory.

19. The system of claim 10, the directory oplock comprising at least one of a read-caching oplock and a read-handle-caching oplock.

20. A computing device encoding computer executable instructions that, when executed by at least one processor, perform a method for managing a directory oplock, the method comprising:
receiving an oplock request for a directory oplock on a directory, the oplock request comprising a first target key and a first parent key;
generating the directory oplock based upon the oplock request;
receiving an access request for access to an object within the directory, the access request comprising a second target key and a second parent key;
when the second parent key does not match the first target key, performing operations comprising:
breaking the directory oplock;
sending notification of the break to a first client originating the oplock request; and
sending notification to a second client originating the access request to wait until acknowledgement of the break by the first client, the access request corresponding to a request by the second client to perform an operation upon the directory; and
when the second parent key matches the first target key, not breaking the directory oplock.

* * * * *